United States Patent
Harris et al.

(10) Patent No.: US 6,906,314 B2
(45) Date of Patent: Jun. 14, 2005

(54) SYSTEMS AND METHODS FOR PROVIDING MULTIPLE OBJECT PLANES IN AN OPTICAL IMAGE SCANNER

(75) Inventors: Rodney C. Harris, Fort Collins, CO (US); Kurt E. Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 309 days.

(21) Appl. No.: 10/371,011

(22) Filed: Feb. 20, 2003

(65) Prior Publication Data

US 2004/0164224 A1 Aug. 26, 2004

(51) Int. Cl.⁷ ................................................. H01J 3/14
(52) U.S. Cl. ....................................... 250/235; 250/239
(58) Field of Search ................................. 250/235, 239, 250/234, 236, 208.1, 216; 358/474, 479, 482; 355/55, 82

(56) References Cited

U.S. PATENT DOCUMENTS

| | | |
|---|---|---|
| 4,059,756 A | 11/1977 | Wilwerding |
| 4,225,215 A | 9/1980 | Cojan |
| 5,210,398 A | 5/1993 | Metlisky |
| 5,278,677 A | 1/1994 | Lee et al. |
| 5,362,958 A | 11/1994 | Ando |
| 5,414,534 A | 5/1995 | Bindon |
| 5,450,157 A | 9/1995 | Rees |
| 5,453,784 A | 9/1995 | Krishnan et al. |
| 5,616,909 A | 4/1997 | Arackellian |
| 5,627,366 A | 5/1997 | Katz |
| 5,726,775 A | 3/1998 | Walsh |
| 5,736,738 A | 4/1998 | Movaghar et al. |
| 5,742,326 A | 4/1998 | Matsui et al. |
| 5,756,981 A | 5/1998 | Roustaei et al. |
| 5,786,582 A | 7/1998 | Roustaei et al. |
| 5,814,827 A | 9/1998 | Katz |
| 5,878,152 A | 3/1999 | Sussman |
| 5,898,171 A | 4/1999 | McConica et al. |
| 5,998,786 A | 12/1999 | Movaghar et al. |
| 6,037,968 A | 3/2000 | Emge et al. |
| 6,123,261 A | 9/2000 | Roustaei |
| 6,188,465 B1 | 2/2001 | Rees et al. |
| 6,347,163 B2 | 2/2002 | Roustaei |
| 6,385,352 B1 | 5/2002 | Roustaei |
| 6,399,937 B1 | 6/2002 | Huang et al. |
| 6,438,271 B1 | 8/2002 | Usami et al. |
| 6,603,580 B1 * | 8/2003 | Taillie ........................ 358/474 |

FOREIGN PATENT DOCUMENTS

| | | |
|---|---|---|
| EP | 0327425 | 8/1989 |
| EP | 0946040 | 9/1999 |
| EP | 1003323 | 5/2000 |
| JP | 63222573 | 9/1988 |
| JP | 11341219 | 12/1999 |

OTHER PUBLICATIONS

Translation of Office Action dated Dec. 9, 2003.
United Kingdom Search Report dated Jun. 29, 2004, 4 pgs.

* cited by examiner

Primary Examiner—Que T. Le

(57) ABSTRACT

Systems and methods for optically scanning multiple object planes are provided. One embodiment is a method for providing multiple object planes in an optical image scanning environment comprising positioning a first optical sensor array to receive an optical signal corresponding to a first object plane located a first distance from the platen and positioning a second optical sensor array to receive an optical signal corresponding to a second object plane located a second distance from the platen.

15 Claims, 4 Drawing Sheets

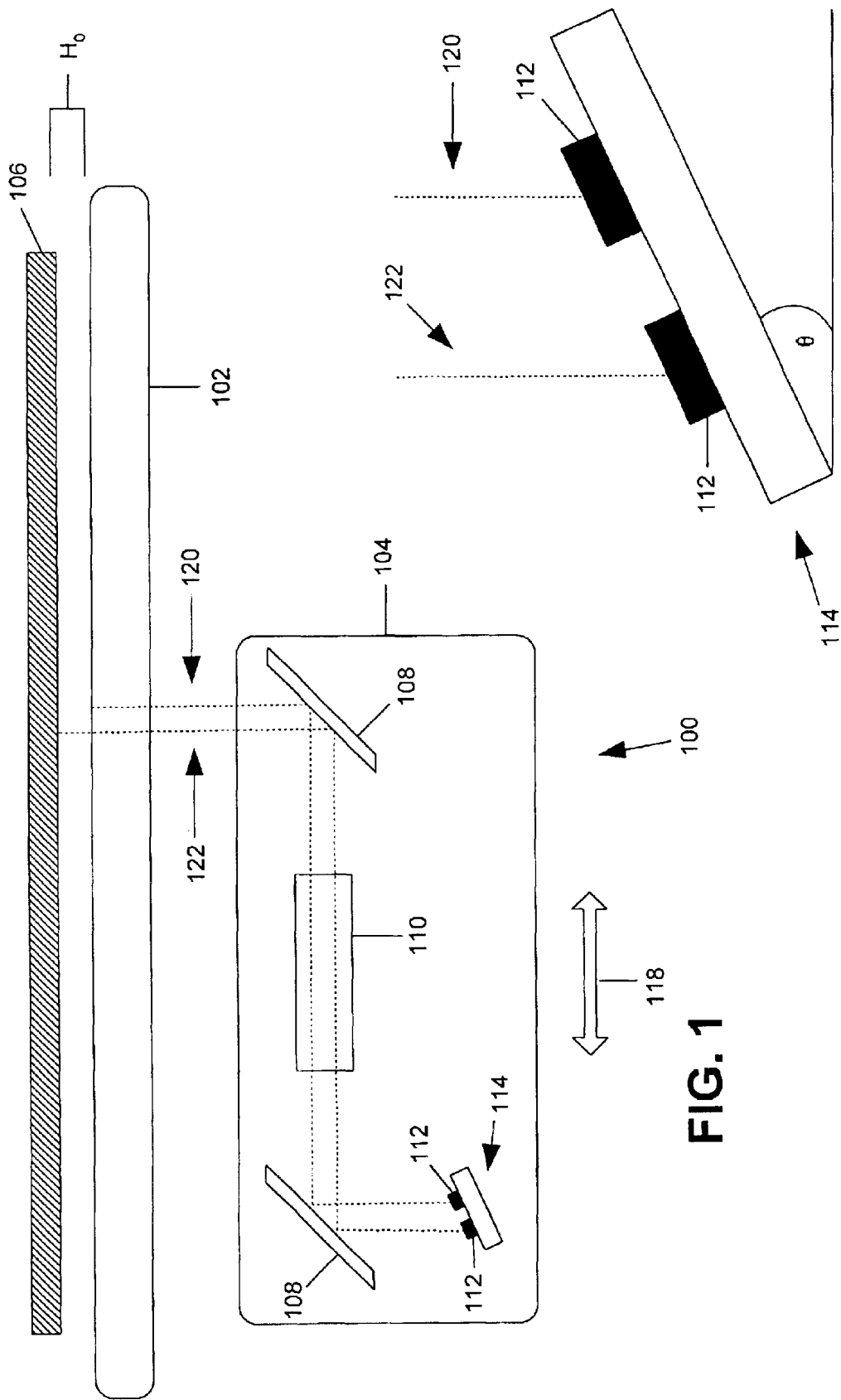

SYSTEMS AND METHODS FOR PROVIDING MULTIPLE OBJECT PLANES IN AN OPTICAL IMAGE SCANNER

BACKGROUND

Optical image scanners, also known as document scanners, convert a visible image (e.g., on a document or photograph, an image in a transparent medium, etc.) into an electronic form suitable for copying, storing, or processing by a computer. An optical image scanner may be a separate device, or an image scanner may be a part of a copier, part of a facsimile machine, or part of a multipurpose device. Reflective image scanners typically have a controlled source of light, and light is reflected off the surface of a document, through an optics system, and onto an array of photosensitive devices (e.g., a charge-coupled device, complimentary metal-oxide semiconductor (CMOS), etc.). Transparency image scanners pass light through a transparent image, for example a photographic positive slide, through optics, and then onto an array of photosensitive devices. The optics focus at least one line, called a scanline, of the image being scanned, onto the array of photosensitive devices. The photosensitive devices convert received light intensity into an electronic signal. An analog-to-digital converter converts the electronic signal into computer readable binary numbers, with each binary member representing an intensity value.

There are two common types of image scanners. In a first type, a single spherical reduction lens system is commonly used to focus the scanline onto the photosensor array, and the length of the photosensor array is much less than the length of the scanline. In a second type, an array of many lenses is used to focus the scanline onto the photosensor array, and the length of the photosensor array is the same length as the scanline. For the second type, it is common to use Selfoc® lens arrays (SLA) (available from Nippon Sheet Glass Co.), in which an array of rod-shaped lenses is used, typically with multiple photosensors receiving light through each individual lens.

Depth of focus refers to the maximum distance that the object position may be changed while maintaining a certain image resolution (i.e., the amount by which an object plane may be shifted along the optical path with respect to some reference plane and introduce no more than a specified acceptable blur). The depth of focus for lens arrays is typically relatively short in comparison to scanners using a single spherical reduction lens system. Typically, flat documents are forced by a cover against a transparent platen for scanning, so depth of focus is not a problem. However, there are some situations in which the surface being scanned cannot be placed directly onto a platen. One example is scanning 35 mm slides. A typical frame for a 35 mm slide holds the surface of the film about 0.7–1.5 mm above the surface of the platen. As a result, slides may be slightly out of focus when using lens arrays that are focused at the surface of the platen. Another example is scanning books or magazines where part of a page being scanned curves into a binding spline, causing part of the surface being scanned to be positioned above the transparent platen. A large depth of focus is needed to sharply image the binding spline.

SUMMARY

Embodiments of the present invention provide systems and methods for optically scanning multiple object planes.

One embodiment is a system for optically scanning multiple object planes comprising a platen and an optical head having an image sensor module. The image sensor module comprises a first optical sensor array positioned to receive an optical signal corresponding to a first object plane located a first distance from the platen. The image sensor module further comprises a second optical sensor array positioned to receive an optical signal corresponding to a second object plane located a second distance from the platen.

Another embodiment is a method for providing multiple object planes in an optical image scanning environment comprising positioning a first optical sensor array to receive an optical signal corresponding to a first object plane located a first distance from the platen and positioning a second optical sensor array to receive an optical signal corresponding to a second object plane located a second distance from the platen.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1 is a block diagram of a cross-sectional view of an embodiment of an optical image scanner according to present invention for providing multiple object planes.

FIG. 2 is a cross-sectional view of the image sensor module of FIG. 1, illustrating an angled relationship between the two optical sensor arrays.

DETAILED DESCRIPTION

Figure 3:
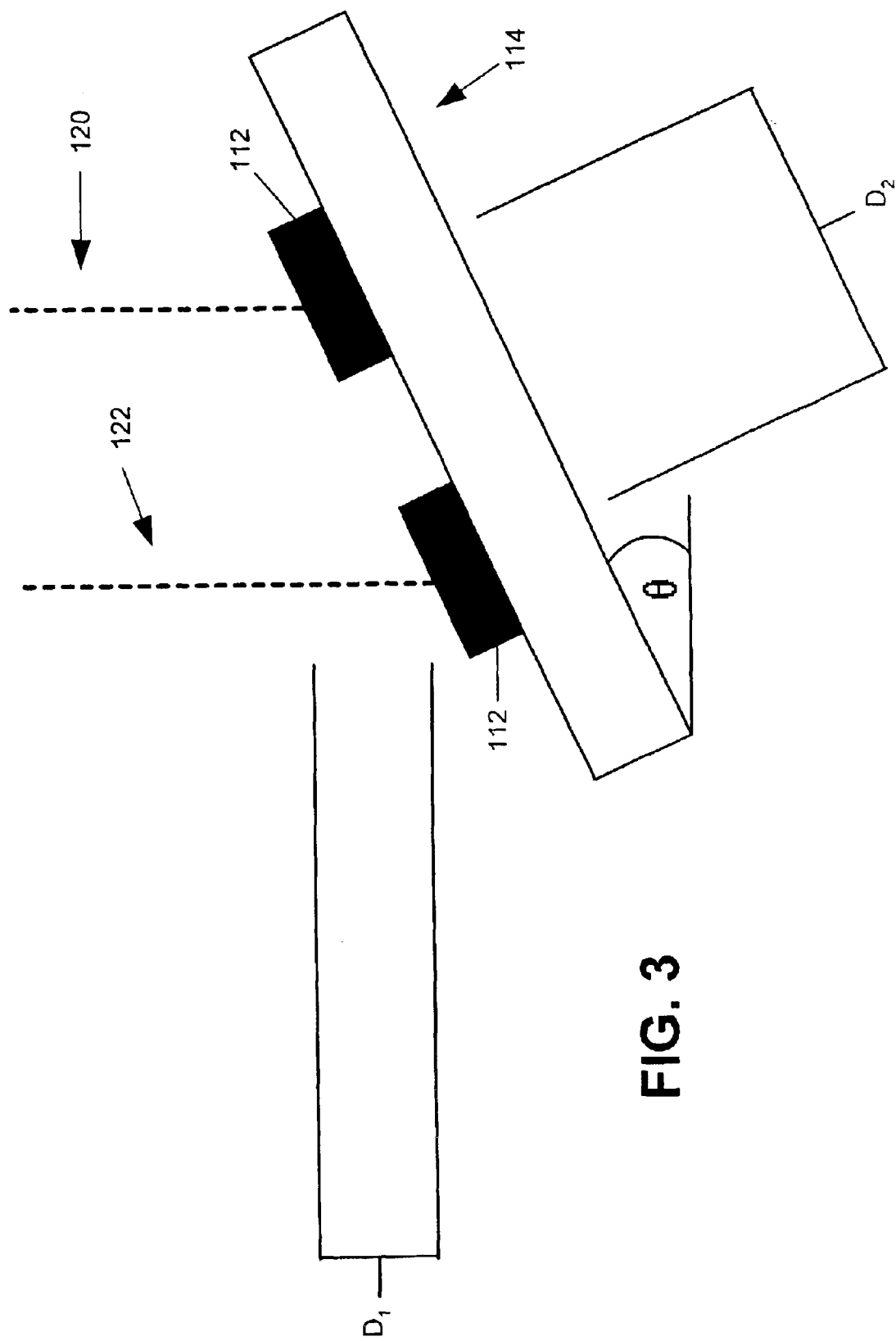
FIG. 3 is a cross-sectional view of an image sensor module such as is shown in FIGS. 1 and 2, which further illustrates the geometrical relationship between the two optical sensor arrays.

FIG. 1 is a block diagram of a cross-sectional view of an optical image scanner 100 according to the present invention for providing multiple object planes to be scanned. Various exemplary embodiments are described below in detail. However, by way of introduction, optical image scanner 100 provides a means for scanning an image at multiple object planes without having to reposition optical head 104 relative to platen 102. Instead of moving optical head 104, various embodiments of the present invention provide multiple object planes by modifying the internal optics of optical head 104. In this regard, optical head 104 may remain fixed relative to platen 102, while the internal optics are configured to provide multiple object planes (i.e., primary focal point at various distances above the top surface of platen 102). It should be appreciated, however, that in some embodiments of the present invention optical head 104 may also be repositioned to provide further flexibility in shifting object planes.

The relative sizes of various objects in FIG. 1 are exaggerated to facilitate illustration. As shown in FIG. 1, optical image scanner 100 comprises an optical head 104 (also known as a carriage) positioned relative to a transparent platen 102. As known in the art, a document 106 may be placed on the top surface of the platen 102 for scanning. Optical image scanner 100 may be included within an optical image scanner (e.g., a low profile flatbed scanner), a facsimile machine, copier, etc.

As further illustrated in FIG. 1, optical head 104 comprises a first reflective surface 108 (e.g., mirror, etc.), a lens array 110, a second reflective surface 108, and an image sensor module 114. Image sensor module 114 may comprise, for example, a printed circuit assembly or any other semiconductor device. Image sensor module 114 also includes at least two photosensor arrays 112, which may be any type of device configured to receive optical signals and convert the light intensity into an electronic signal. For example, as known in the art, photosensor arrays 112 may comprise a charge-coupled device (CCD), complimentary metal-oxide semiconductor (CMOS), etc.

Lens array 110 may comprise an array of rod-shaped lenses which have a relatively short depth of focus. For example, lens array 110 may comprise a Selfoc® lens array (SLA), which is manufactured and sold by Nippon Sheet Glass Co. of Somerset, N.J. A rod-lens array may comprise at least one row of graded-index micro lenses, which may be equal in dimensions and optical properties. The lenses may be aligned between two fiberglass-reinforced plastic (FRP) plates. Because FRP has a coefficient of thermal expansion equal to glass, thermal distortion and stress effects is minimal. The FRP also increases mechanical strength of the SLA. The interstices may be filled with black silicone to prevent flare (crosstalk) between the lenses and protect each individual lens.

Referring again to FIG. 1, as a document 106 is being scanned by optical head 104, an optical signal(s) (along paths 120 and 122) is reflected off the document 106 and towards the first reflective surface 108. The first reflective surface 108 directs the optical signal(s) through the lens array 110 to be focused. The optical signal(s) may also be reflected toward image sensor module 114 by a second reflective surface 108. The optical signal(s) (along paths 120 and 122) is received by corresponding photosensor arrays 112 and converted into an electronic signal, which may be processed by an analog-to-digital converter, digital signal processor, etc. In this manner, the optics within optical head 104 focus a portion of an image of document 106 onto at least photosensor array 112. One photosensor array 112 is positioned within optical head 104 to receive a first optical signal (along path 120) corresponding to a first object plane located a first distance from platen 102 (e.g., near the top surface of platen 102). A second photosensor array 112 is positioned within optical head 104 to receive a second optical signal (along path 122) corresponding to a second object plane located a second distance from platen 102 (e.g., a distance $H_0$ away from the top surface of platen 102).

It should be appreciated that optical image scanner 100 may be configured in a number of alternative ways. For instance, in order to alter the cross-sectional profile of optical head 104, second reflective surface 108 may be removed and the image sensor module 114 may be oriented perpendicular to the optical axis of lens array 110 to receive optical signal 116. Alternatively, the optical axis of lens array 110 may be oriented perpendicular to platen 102 to direct light through lens array 110 and onto photosensor arrays 112. The particular orientation of lens array 110 is not relevant to the present invention.

The optical components within optical head 104 focus at least one line (i.e., a scanline) of the image being scanned onto photosensor arrays 112. As known in the art, scanning of the entire image may be accomplished by translating optical head 104 relative to document 106 (e.g., by using cables) as indicated by reference number 118.

As mentioned above, due to the relatively small depth of focus of lens array 110, existing optical image scanners may produce blurred images of documents 106 that are positioned a small distance above the primary focal point of lens array 110. For example, existing optical image scanners may be configured with the primary focal point at a relatively short distance $H_0$ above the top surface of platen 102. When a document 106, such as a sheet of paper, etc. is positioned on platen 102, it may be located approximately the distance $H_0$ above the top surface of platen 102 or within the relatively small range of the depth of focus. However, if the document 106 is positioned at an object plane that is outside of a range of acceptable focus, existing optical image scanners may produce a blurred image. For instance, various types of documents (or portions of the document) may be located at an object plane outside of the range of acceptable focus when positioned on platen 102 (e.g., 35 mm slides, transparencies, photographs, books, magazines, etc.).

Having described a general overview of optical image scanner 110, various systems and methods according to the present invention for providing multiple object planes to be scanned will be described. As stated above, the relative positioning of the first and second photosensor arrays 112 may be accomplished in a number of ways. In a broad sense, photosensor arrays 112 are positioned so that the optical distance between one photosensor array 112 and lens array 110 (e.g., optical path 122) is longer than the optical distance between the other photosensor array 112 and lens array 110 (e.g., optical path 120). In other words, each photosensor array 112 is located at a point of sharp focus for the corresponding object plane. It will be appreciated that the differential in the optical path lengths between each photosensor array 112 and lens array 110 provides an equal differential in the corresponding object planes. As illustrated in FIG. 1, an object plane corresponding to optical path 120 may be located just above the top surface of platen 102 and an object plane corresponding to optical path 122 may be located at a distance $H_0$ above the top surface of platen 102. For example, if the optical distance between one photosensor array 112 and lens array 110 is 10 units of length and the optical distance between the other photosensor array 112 and lens array 110 is 12 units of lengths, two different object planes (2 units of length apart–$H_0$) may be provided.

FIGS. 1–3 illustrate one of a number of embodiments for providing the relative positioning of photosensor arrays 112. In this embodiment, the relative positioning is provided by angling image sensor module 114. As best illustrated in FIG. 2, image sensor module 114 may be disposed at a non-orthogonal angle (θ) relative to the optical axis of lens array 110. In this angled relationship, one photosensor array 112 is shifted to a position that is farther away from lens array 110 than the other photosensor array 112. The optical distance between one photosensor array 112 and lens array 110 (e.g., optical path 120) is longer than the optical distance between the other photosensor array 112 and lens array 110 (e.g., optical path 122). As mentioned above, this differential in the optical path lengths between each photosensor array 112 and lens array 110 provides an equal differential in the corresponding object planes. One of ordinary skill in the art will appreciate that the distance between object planes may be designed based on Equation 1 below.

$$\sin\theta = D_1/D_2;\qquad \text{Equation 1}$$

$D_1$ = distance between optical paths & distance between image object $D_2$ = lateral distance between photosensor arrays 112

In this manner, the angle (θ) may be selected to shift the object plane a particular distance above the top surface of platen 102.

One of ordinary skill in the art will appreciate that optical image scanner 100 may be configured in a variety of alternative ways. For example, the second reflective surface 108 may be removed and image sensor module 114 positioned to receive optical signals (along paths 120 and 122) without being reflected. In this configuration, it will be appreciated that image sensor module 114 may be disposed at a non-orthogonal angle (θ) relative to an axis perpendicular to the optical axis of lens array 110. In more general terms, the angle (θ) may be described with respect to the angle of incidence of optical signals (along paths 120 and 122). Thus, the relative positioning of photosensor arrays 112 may be accomplished in a number of alternative ways depending on the positioning of lens array 110, the positioning and number of reflective surfaces 108, etc.

Figure 4:
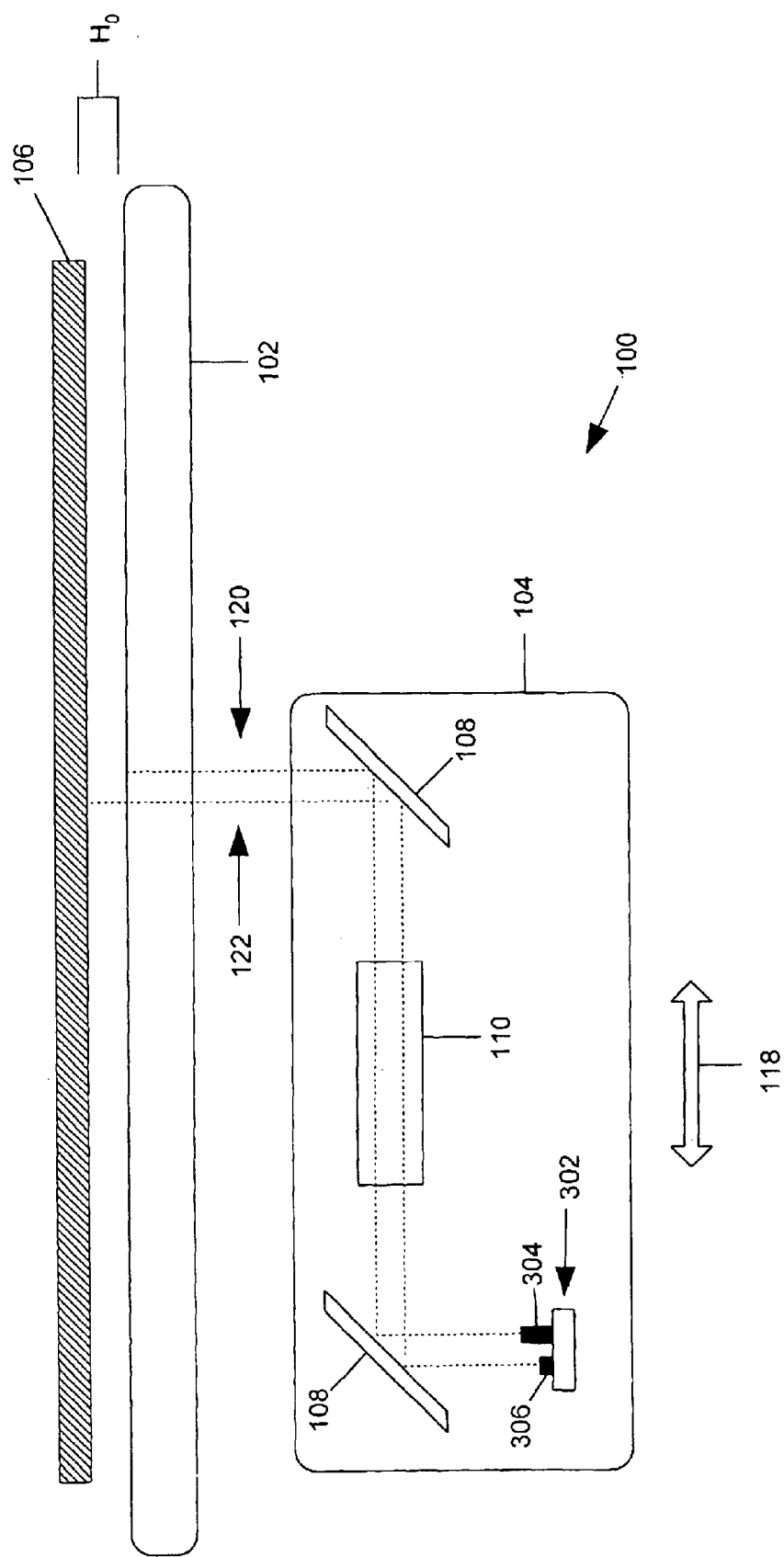
FIG. 4 is a block diagram of a cross-sectional view of another embodiment of an optical image scanner according to the present invention for providing multiple object planes.
Figure 5:
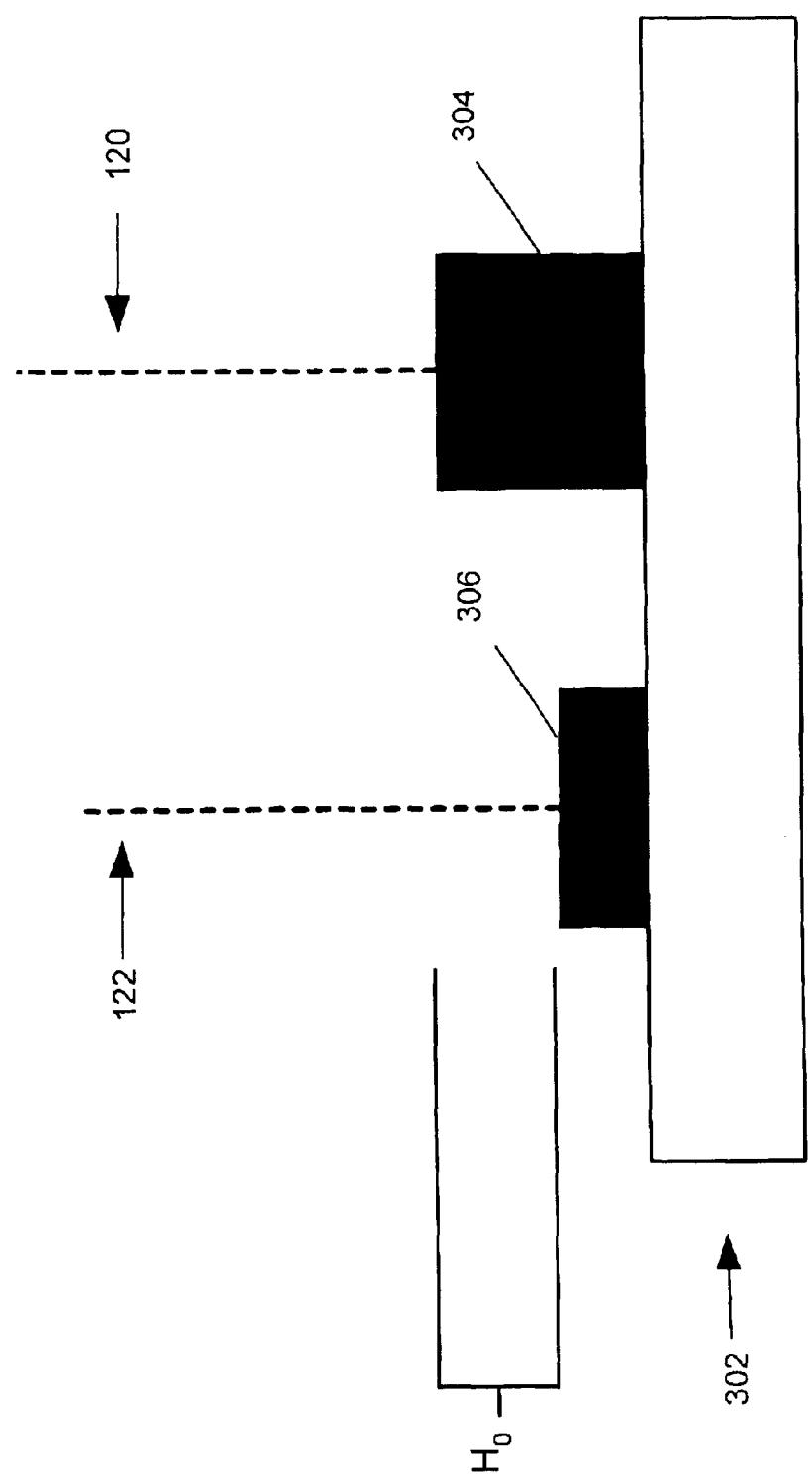
FIG. 5 is a cross-sectional view of the image sensor module of FIG. 4, which illustrates the relationship between the two optical sensor arrays.

FIG. 4 is a block diagram of a cross-sectional view of another embodiment of an optical image scanner 100, according to present invention, for providing multiple object planes to be scanned. Optical image scanner 100 may be configured as described above. In this embodiment, an image sensor module 302 is not disposed in an angled relationship; rather, image sensor module 302 is disposed in a typical orthogonal relationship. As best illustrated in FIG. 5, the relative positioning of the photosensor arrays is achieved by positioning each photosensor array 112 at a different distance from the orthogonal image sensor module 302. For instance, one photosensor array 304 may be disposed a first distance from image sensor module 302 and another photosensor array 306 may be raised to a second distance from image sensor module 302.

In this manner, photosensor array 306 is in a position relative to photosensor array 304 that is farther away from lens array 110. As described above, this differential ($H_0$) in the optical path lengths between photosensor arrays 304 and 306 and lens array 110 provides an equal differential in the corresponding object planes. One of ordinary skill in the art will appreciate that optical image scanner 100 may also be configured in a variety of alternative ways. For example, the second reflective surface 108 may be removed and image sensor module 702 positioned to receive optical signals (along paths 120 and 122) without being reflected.

Therefore, having thus described the invention, at least the following is claimed:

1. A system for optically scanning multiple object planes, the system comprising: a platen; and an optical head having an image sensor module, the image sensor module comprising:

a first optical sensor array positioned to receive an optical signal corresponding to a first object plane located a first distance from the platen; and a second optical sensor array positioned to receive an optical signal corresponding to a second object plane located a second distance from the platen.

2. The system of claim 1, wherein the image sensor module is disposed in an angled relationship with respect to the optical axis of a lens array.

3. The system of claim 1, wherein the image sensor module is disposed normal to the optical axis of a lens array.

4. The system of claim 1, wherein the first optical sensor array is disposed a first distance from the image sensor module and the second optical sensor array is disposed a second distance from the image sensor module.

5. The system of claim 1, wherein the optical head further comprises a lens array disposed relative to the image sensor module and the platen and through which both optical signals are focused.

6. The system of claim 5, wherein the lens array comprises a rod-lens array.

7. The system of claim 1, wherein the optical head further comprises a reflective surface disposed relative to a lens array and the platen for directing both optical signals through the lens array.

8. The system of claim 7, wherein the optical head further comprises a second reflective surface disposed relative to the lens array and the image sensor module for directing both optical signals toward the first and second optical arrays.

9. The system of claim 1, wherein at least one of the first and second optical arrays comprise a linear array of photo-sensitive devices.

10. The system of claim 1, wherein the first and second optical arrays are configured to convert the optical signals into corresponding electrical signals.

11. The system of claim 10, further comprising an analog-to-digital converter configured to receive the corresponding electrical signals and convert them into digital values.

12. A method for providing multiple object planes in an optical image scanning environment, the method comprising:

positioning a first optical sensor array to receive an optical signal corresponding to a first object plane located a first distance from a platen; and providing a second optical sensor array to receive an optical signal corresponding to a second object plane located a second distance from the platen.

13. The method of claim 12, further comprising:

positioning an optical head a predetermined distance from a platen; and providing an image sensor module having the optical sensor arrays.

14. The method of claim 12, wherein the positioning of the first and second optical sensors arrays comprise positioning an image sensor module in an angled relationship with respect to the optical axis of a lens array.

15. The method of claim 12, wherein the positioning the first and second optical sensors comprises:

locating the first optical sensor array a first distance from an image sensor module; and locating the second optical sensor array a second distance from the image sensor module.

* * * * *